United States Patent
Huang et al.

(10) Patent No.: US 9,905,198 B2
(45) Date of Patent: Feb. 27, 2018

(54) DISPLAY PANEL, OPTICAL SENSOR, AND MEASUREMENT METHOD

(71) Applicant: AU Optronics Corporation, Hsin-Chu (TW)

(72) Inventors: Yu-Jung Huang, Hsin-Chu (TW); Wen-Chang Liao, Hsin-Chu (TW); Ting-Cheng Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 121 days.

(21) Appl. No.: 15/174,152

(22) Filed: Jun. 6, 2016

(65) Prior Publication Data

US 2016/0365067 A1     Dec. 15, 2016

(30) Foreign Application Priority Data

Jun. 9, 2015   (TW) .............................. 104118632 A

(51) Int. Cl.
| | |
|---|---|
| *G09G 5/10* | (2006.01) |
| *G01B 11/27* | (2006.01) |
| *G09G 3/20* | (2006.01) |
| *G09G 3/00* | (2006.01) |

(52) U.S. Cl.
CPC ............. *G09G 5/10* (2013.01); *G01B 11/272* (2013.01); *G09G 3/006* (2013.01); *G09G 3/2092* (2013.01); *G09G 2300/0465* (2013.01); *G09G 2310/0286* (2013.01); *G09G 2310/0297* (2013.01); *G09G 2310/08* (2013.01); *G09G 2320/0626* (2013.01); *G09G 2330/08* (2013.01); *G09G 2352/00* (2013.01); *G09G 2360/14* (2013.01); *G09G 2360/145* (2013.01); *G09G 2370/045* (2013.01)

(58) Field of Classification Search
CPC .. G09G 5/10; G09G 3/006; G09G 2320/0626; G09G 2360/14; G01B 11/272
See application file for complete search history.

(56) References Cited

U.S. PATENT DOCUMENTS

2007/0230978 A1* 10/2007 Zaima ................ G03G 15/0131
399/49
2016/0103359 A1*  4/2016 Kimura ................. G02B 5/201
349/33

FOREIGN PATENT DOCUMENTS

| CN | 103268035 A | 8/2013 |
|---|---|---|
| EP | 0361515 B1 | 6/1995 |

* cited by examiner

*Primary Examiner* — Kumar Patel
*Assistant Examiner* — Richard M Russell
(74) *Attorney, Agent, or Firm* — WPAT, PC

(57) ABSTRACT

A display panel includes a first substrate, a shading module, a second substrate, optical sensors, and a parallel-to-serial converter. The shading module is disposed on the first substrate. The second substrate is disposed corresponding to the first substrate. The optical sensors are disposed on the second substrate, and are disposed corresponding to the shading module. The optical sensors are configured to output sensing signals according to an offset amount between the optical sensors and the shading module. One of the optical sensors includes a first switch and a second switch, in which the first switch and the second switch are coupled in cascade. The parallel-to-serial converter is configured to generate the serial signal according to the sensing signals.

20 Claims, 11 Drawing Sheets

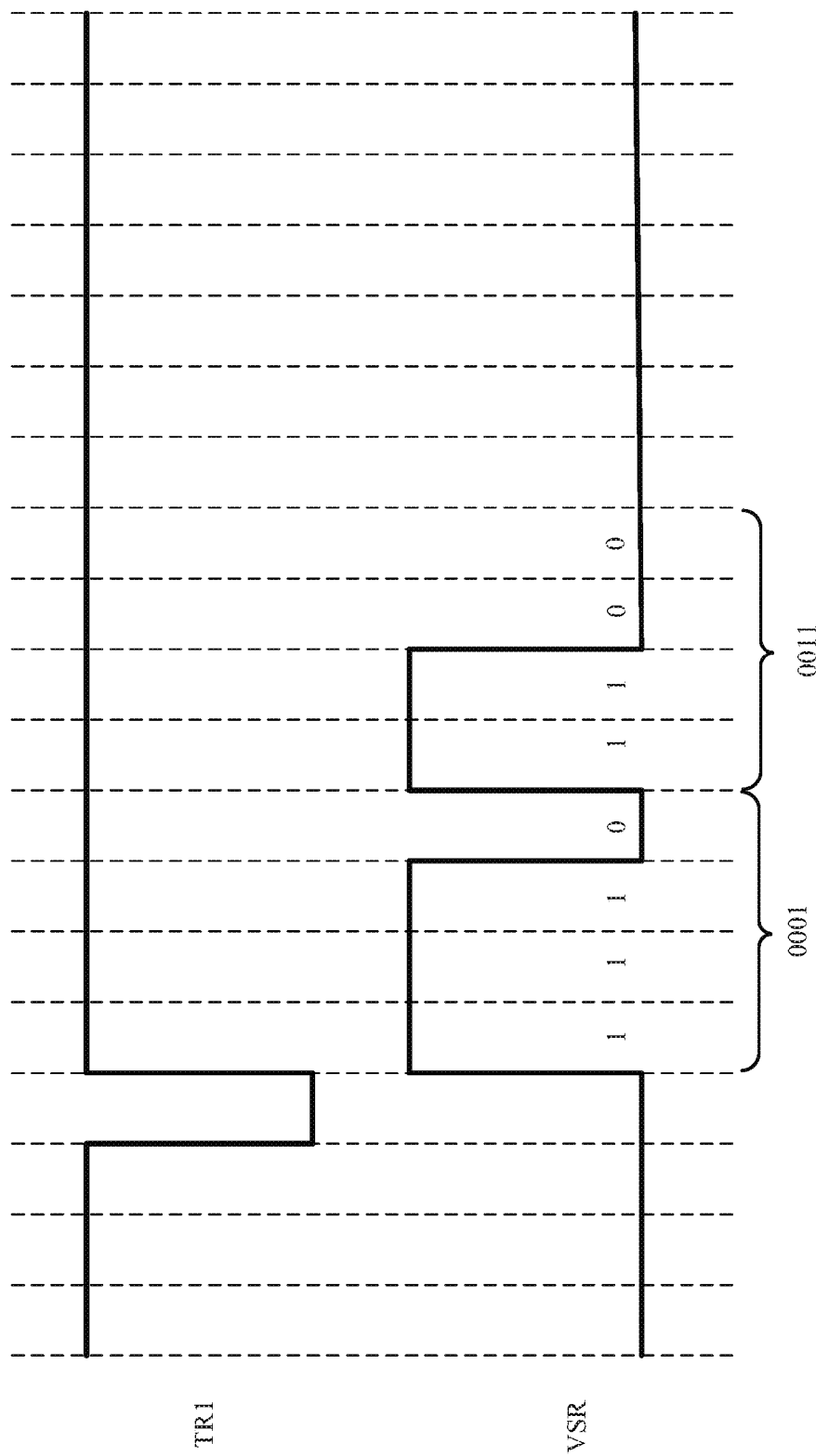

DISPLAY PANEL, OPTICAL SENSOR, AND MEASUREMENT METHOD

RELATED APPLICATIONS

This application claims priority to Taiwan Application Serial Number 104118632 filed Jun. 9, 2015, which is herein incorporated by reference.

BACKGROUND

Technical Field

The present application relates to a display panel. More particularly, the present application relates to the display panel having optical sensors and a measurement method thereof.

Description of Related Art

When manufacturing a display panel, it is required to manually align components such as color filters and pixel matrixes between substrates of the display panel. If the components between the substrates are not precisely aligned, the performance of the display panel is reduced. However, such manual alignment is time-consuming and significantly reduces the manufacturing effectiveness.

SUMMARY

One aspect of the present disclosure provides a display panel. The display panel includes a first substrate, a shading module, a second substrate, optical sensors and a parallel-to-serial converter. The shading module is disposed on the first substrate. The second substrate is disposed corresponding to the first substrate. The optical sensors are disposed on the second substrate, and are disposed corresponding to the shading module. The optical sensors are configured to output multiple first sensing signals according to a shift amount between the optical sensors and the shading module. The parallel-to-serial converter is configured to generate a serial signal according to the first sensing signals. A first optical sensor of the optical sensors includes a first switch and a second switch. A first terminal of the first switch is configured to receive a first system voltage. A second terminal of the first switch is configured to output one of the first sensing signals. A control terminal of the first switch is coupled to the second terminal of the first switch. A first terminal of the second switch is coupled to the second terminal of the first switch. A second terminal of the second switch is configured to receive a second system voltage. The first system voltage is higher than the second system voltage. A control terminal of the second switch is coupled to the second terminal of the second switch.

One aspect of the present disclosure provides a display panel. The display panel includes a first substrate, a shading module, a second substrate, optical sensors, and a parallel-to-serial converter. The shading module is disposed on the first substrate. The second substrate is disposed corresponding to the first substrate. The optical sensors are disposed on the second substrate and disposed corresponding to the shading module. The optical sensors are configured to output first sensing signals according to a shift amount between the optical sensors and the shading module. The parallel-to-serial converter is configured to receive the first sensing signals to generate a serial signal. One of the optical sensors is configured to receive a first system voltage and a second system voltage, and the first system voltage is higher than the second system voltage.

One aspect of the present disclosure provides a measurement method for measuring a display panel. The measurement method includes following steps. Multiple sensing signals are outputted by multiple optical sensors according to a shift amount between the optical sensors and black matrixes in the display panel. One of the optical sensors comprises a first switch and a second switch. A first terminal of the first switch is configured to receive a first system voltage, a second terminal of the first switch is configured to output one of the first sensing signals, a control terminal of the first switch is coupled to the second terminal of the first switch. A first terminal of the second switch is coupled to the second terminal of the first switch, a second terminal of the second switch is configured to receive a second system voltage, the first system voltage is higher than the second system voltage, and a control terminal of the second switch is coupled to the second terminal of the second switch. And, a serial signal is outputted by a parallel-to-serial converter according to the sensing signals to determine the shift amount according to the serial signal.

In summary, in the display panel, the optical sensor and the measurement method provided by the present disclosure, a mechanism of optical sensing is established in the panel in order to measure whether the arrangement of the components in the display panel is shifted, and to automatically adjust a brightness of the display panel according to the shift situation.

BRIEF DESCRIPTION OF THE DRAWINGS

This disclosure can be more fully understood by reading the following detailed description of the embodiment, with reference made to the accompanying drawings as follows:

FIG. 5C is a diagram illustrating waveforms of the initial trigger signal and the serial signal, according to some embodiments of the present disclosure.

DETAILED DESCRIPTION

Figure 1A:
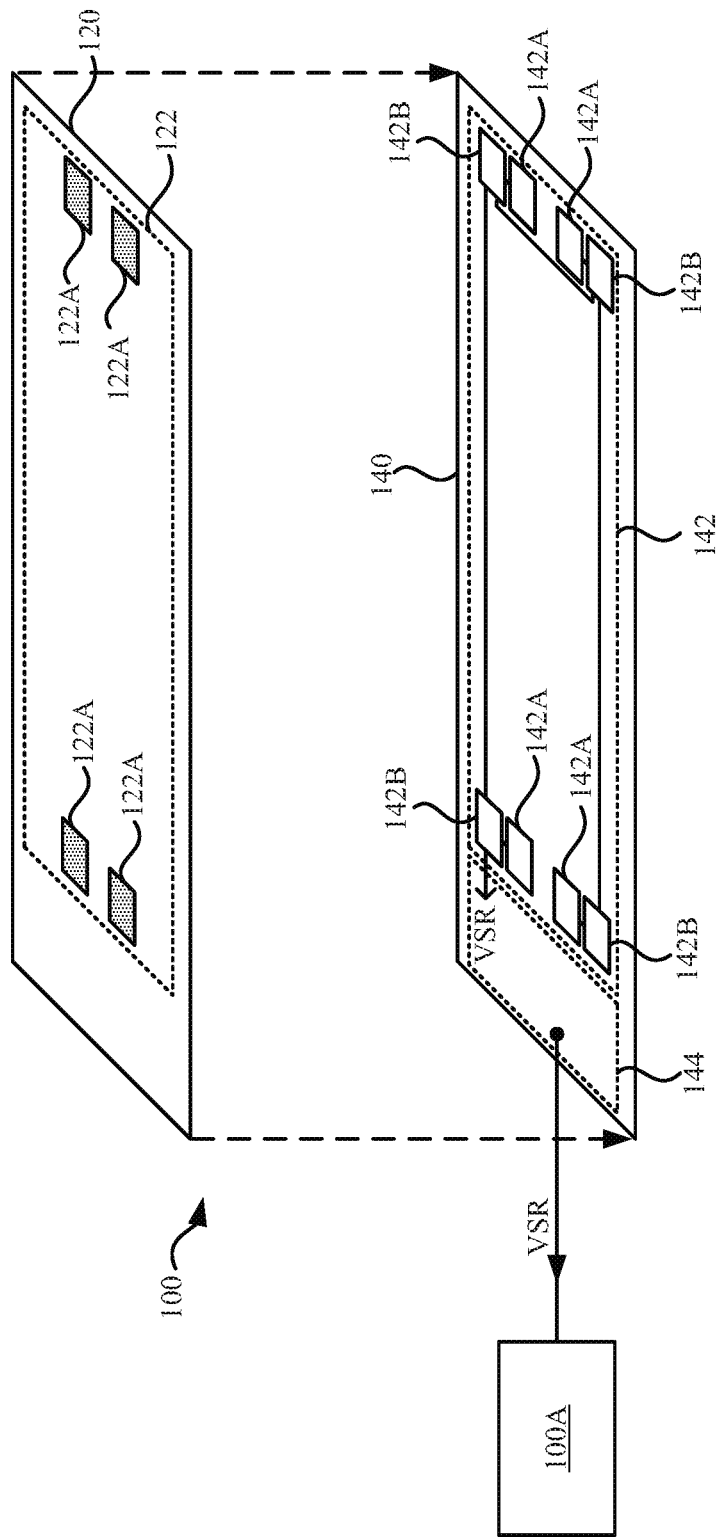
FIG. 1A is a schematic diagram illustrating a display panel, according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the term "coupled" may also be termed as "electrically coupled," and the term "connected" may be termed as "electrically connected." "Coupled" and "connected" may also be used to indicate that two or more elements cooperate or interact with each other.

Reference is now made to FIG. 1A. FIG. 1A is a schematic diagram illustrating a display panel 100, according to some embodiments of the present disclosure. As shown in FIG. 1A, the display panel 100 includes a substrate 120 and a substrate 140.

In some embodiments, the substrate 120 is a color filter substrate, and the substrate 140 is a thin film transistor (TFT) substrate. In some embodiments, the substrate 120 and the substrate 140 are glass substrates. As shown in FIG. 1A, the substrate 120 and the substrate 140 are disposed corresponding to the each other. Therefore, multiple TFTs (not shown) in the substrate 140 can control the light penetrating the substrate 120, and then different colors are displayed through the color filter in the substrate 120. The substrate 120 includes multiple shading modules 122A. The substrate 140 includes a display area 142 and an outer lead bonding (OLB) 144. In some embodiments, as shown in FIG. 1A, the shading modules 122A are disposed in an area 122 of the substrate 120 corresponding to the display area 142. In some embodiments, the shading modules 122A are implemented with one or more black matrixes juxtaposed with each other. The arrangement of the shading modules 122A described above is given for illustrative purpose only, and the present disclosure is not limited thereto.

The display area 142 includes multiple optical sensor modules 142A and a parallel-to-serial converter 142B. As described above, the locations of the optical sensor modules 142A are corresponding to the locations of the shading modules 122A. As shown in FIG. 1A, the optical sensor modules 142A are disposed at four corners of the display area 142 to correspond to the shading modules 122A. The optical sensor modules 142A can output different sensing signals (e.g. sensing signal VS1 in FIG. 2A below) according to a shift amount between the optical sensor modules 142A and the shading modules 122A. In the embodiment, the parallel-to-serial converter 142B is divided into four cascaded stage circuits, in which each stage circuit is disposed corresponding to one of the optical sensor modules 142A. Therefore, each stage circuit of the parallel-to-serial converter 142B can simultaneously receive the sensing signal outputted by the corresponding optical sensor module 142A, and correspondingly outputs a serial signal VSR. In some embodiments, the OLB 144 is electrically connected to a cell tester 100A or other external test equipment (e.g. one time programmable (OTP) equipment), so as to measure the shift amount between the optical sensor modules 142A and the shading modules 122A according to the serial signal VSR.

In some embodiments, the optical sensor modules 142A includes multiple optical sensors (e.g. optical sensor 200 shown in FIG. 3A below) juxtaposed with each other. A predetermined shift amount (e.g. about 0.5 micrometer) is disposed between intervals of the optical sensors and intervals of the shading modules 122A. With such arrangement, during the measurement, left half parts of some optical sensors will be shaded by the shading modules 122A and cannot receive light; right half parts of some optical sensors will be shaded by the shading modules 122A and cannot receive the light; and part of the optical sensors will be completely shaded by the shading modules 122A. Therefore, each optical sensor can generate different sensing signal VS1 according to different shading situations, in order to determine the shift amount between the optical sensor modules 142A and the shading modules 122A. The parallel-to-serial converter 142B is configured to process the sensing signals outputted from the optical sensor modules 142A in parallel, to generate the serial signal VSR. Accordingly, the shift amount between the optical sensor modules 142A and the shading module 122A can be estimated. In other words, with such arrangement, it is further tested that whether the locations between the color filter on the substrate 120 and the TFTs on the substrate 140 is shifted due to a process variation. Therefore, an aperture ratio of the display panel 100 can be estimated so that the brightness of the display can be adjusted.

The aforementioned arrangement and the number of the optical sensor modules 142A and the shading module 122A in FIG. 1A are given for illustrative purposes only. Any other numbers and arrangements of the optical sensor modules 142A and the shading modules 122A are within the contemplated scope of the present disclosure.

Figure 1B:
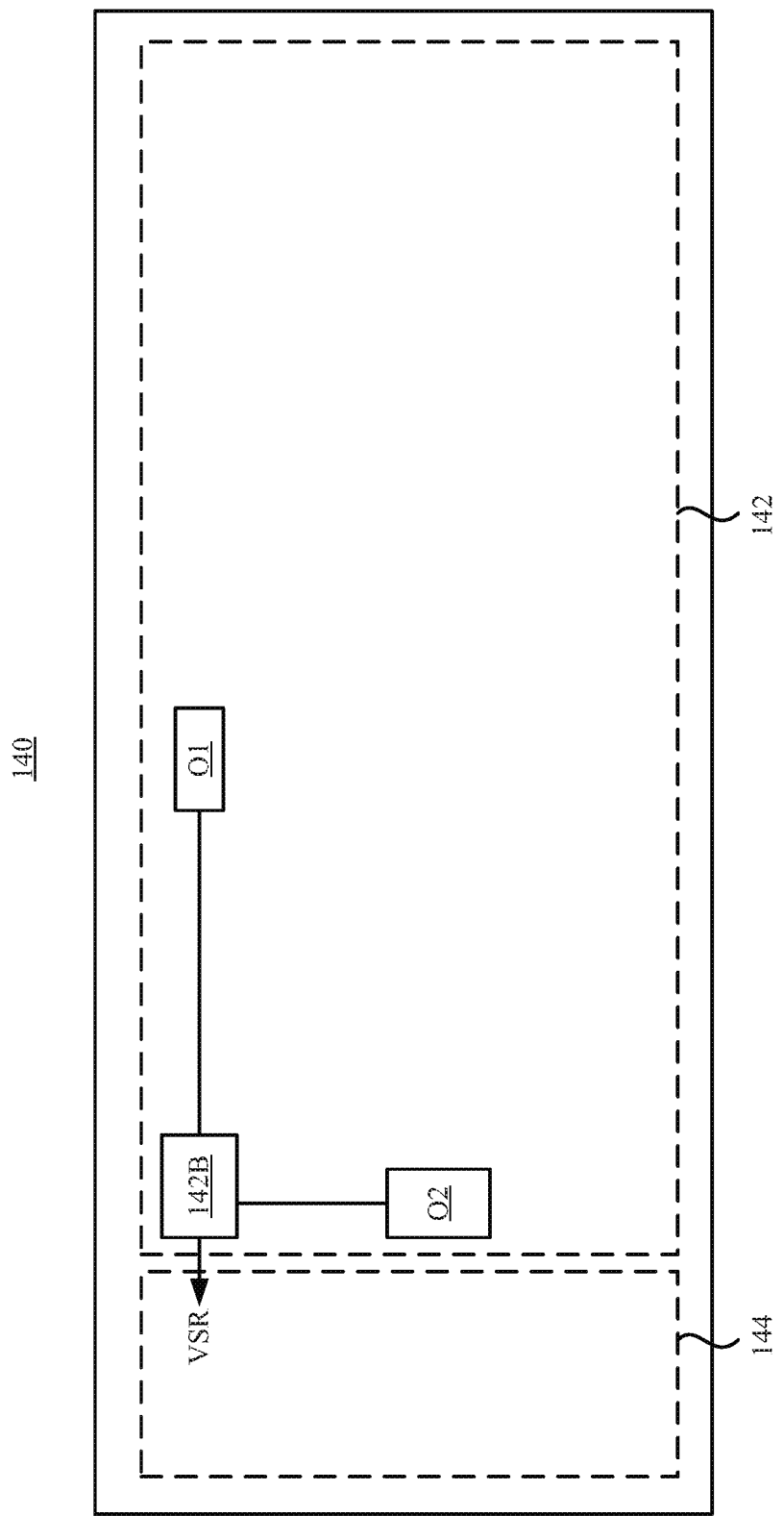
FIG. 1B is a schematic diagram illustrating a substrate shown in FIG. 1A, according to some embodiments of the present disclosure.

Reference is now made to FIG. 1B. FIG. 1B is a schematic diagram illustrating the substrate 140 shown in FIG. 1A, according to some embodiments of the present disclosure. For example, as shown in FIG. 1B, the substrate 140 includes an optical sensor module O1 and an optical sensor module O2. The optical sensor module O1 is disposed at an upper side of the display area 142, the optical sensor module O2 is disposed at a left side of the display area 142, and one stage circuit of the parallel-to-serial converter 142B is disposed besides the optical sensor module O1 and the optical sensor module O2. In other words, there is at least one optical sensor module 142A (i.e. the optical sensor module O1) disposed along a horizontal direction of the display area 142 and at least one optical sensor module 142A (i.e. the optical sensor modules O2) disposed along a vertical direction of the display area 142. The two optical sensor modules 142A share the same parallel-to-serial converter 142B to estimate the shift amounts between the substrate 120 and the substrate 140 along the horizontal direction and along the vertical direction. The embodiment described above is just an example, and people in the art should be able to adjust related disposition according to practical requirement.

Several embodiments will be provided in following paragraphs to describe the function and the application of the display panel 100, but the present disclosure is not limited thereto.

Figure 2A:
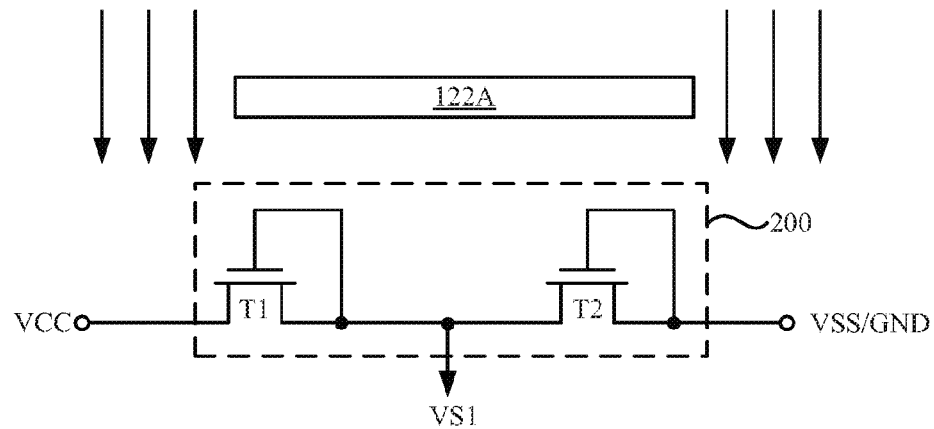
FIG. 2A is a schematic diagram illustrating an optical sensor, according to some embodiments of the present disclosure.

Reference is now made to FIG. 2A. FIG. 2A is a schematic diagram illustrating an optical sensor, according to some embodiments of the present disclosure. In various embodiments, the aforementioned optical sensor modules 142A include one or more optical sensors 200. In some embodiments, several optical sensors 200 in the optical sensor modules 142A are disposed juxtaposed to the each other.

As shown in FIG. 2A, the optical sensor 200 includes a thin film transistor (TFT) T1 and a TFT T2. A first terminal of the TFT T1 is used to receive a system voltage VCC, a second terminal of the TFT T1 is used to output the sensing signal VS1, and a control terminal of the TFT T1 is coupled to the second terminal of the TFT T1. A first terminal of the TFT T2 is coupled to the second terminal of the TFT T1, a second terminal of the TFT T2 is used to receive a system voltage VSS or is coupled to a ground GND, and a control terminal of the TFT T2 is coupled to the second terminal of the TFT T2. The system voltage VCC is higher than the system voltage VSS.

As shown in FIG. 2A, the control terminal and the second terminal of both of the TFT T1 and the TFT T2 are coupled to the each other, and thus the voltage difference between the control terminal and the second terminal of both of the TFT T1 and the TFT T2 is zero. Therefore, the electric potential between the TFT T1 and the TFT T2 is determined by whether the TFT T1 and the TFT T2 are covered by the shading module 122A.

In some embodiments, the TFTS T1-T2 in FIG. 2A are able to be replaced with light sensitive elements. In some embodiments, the light sensitive element includes a TFT. In some other embodiments, the light sensitive element includes a diode. The implementations of the light sensitive element are given for illustrative purposes. Various implementations of the light sensitive element are with a contemplated scope of the present disclosure.

Figure 2B:
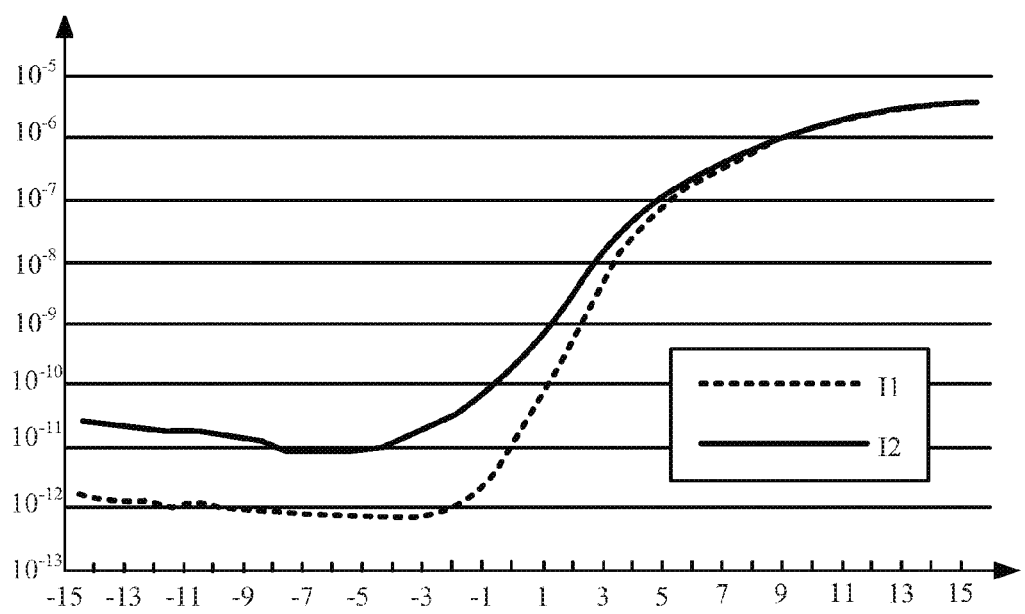
FIG. 2B is a diagram illustrating a current variation of the TFT shown in FIG. 2A when it is under light and not under light, according to some embodiments of the present disclosure.

Reference is now made to FIG. 2B. FIG. 2B is a diagram illustrating a current variation of the TFT T1 shown in FIG. 2A when it is under light and not under light, according to some embodiments of the present disclosure.

In some embodiments, the threshold voltage of the TFT T1 under light is decreased so that the resistance of the TFT T1 is equivalently decreased to become a conductive path. For example, as shown in FIG. 2B, VGS denotes the voltage difference between the control terminal and the second terminal of the TFT T1. When the voltage difference VGS of the TFT T1 is zero and it is not under light, a current I1 of the TFT T1 is about 0.01 nA. When the voltage difference VGS of the TFT T1 is zero and it's under light, in which the intensity of the light is about 20 nit, a current I2 of the TFT T1 is about 0.1 nA. In other words, the current of the TFT T1 under light is about 10 times of the current without light. Therefore, when the TFT T1 is under light, the resistance of the TFT T1 is decreased so that the system voltage VCC is transmitted to the second terminal of the TFT T1. As a result, the optical sensor 200 outputs the sensing signal VS1 having a higher electric potential. Alternatively, when the TFT T2 is under light, the resistance of the TFT T2 is decreased so that the system voltage VSS is transmitted to the second terminal of the TFT T1. As a result, the optical sensor 200 outputs the sensing signal VS1 having a lower electric potential. Therefore, through the disposition, a shift direction between the shading module 122A and the optical sensor 200 can be determined by the electric potential of the sensing signal VS1.

Figure 2C:
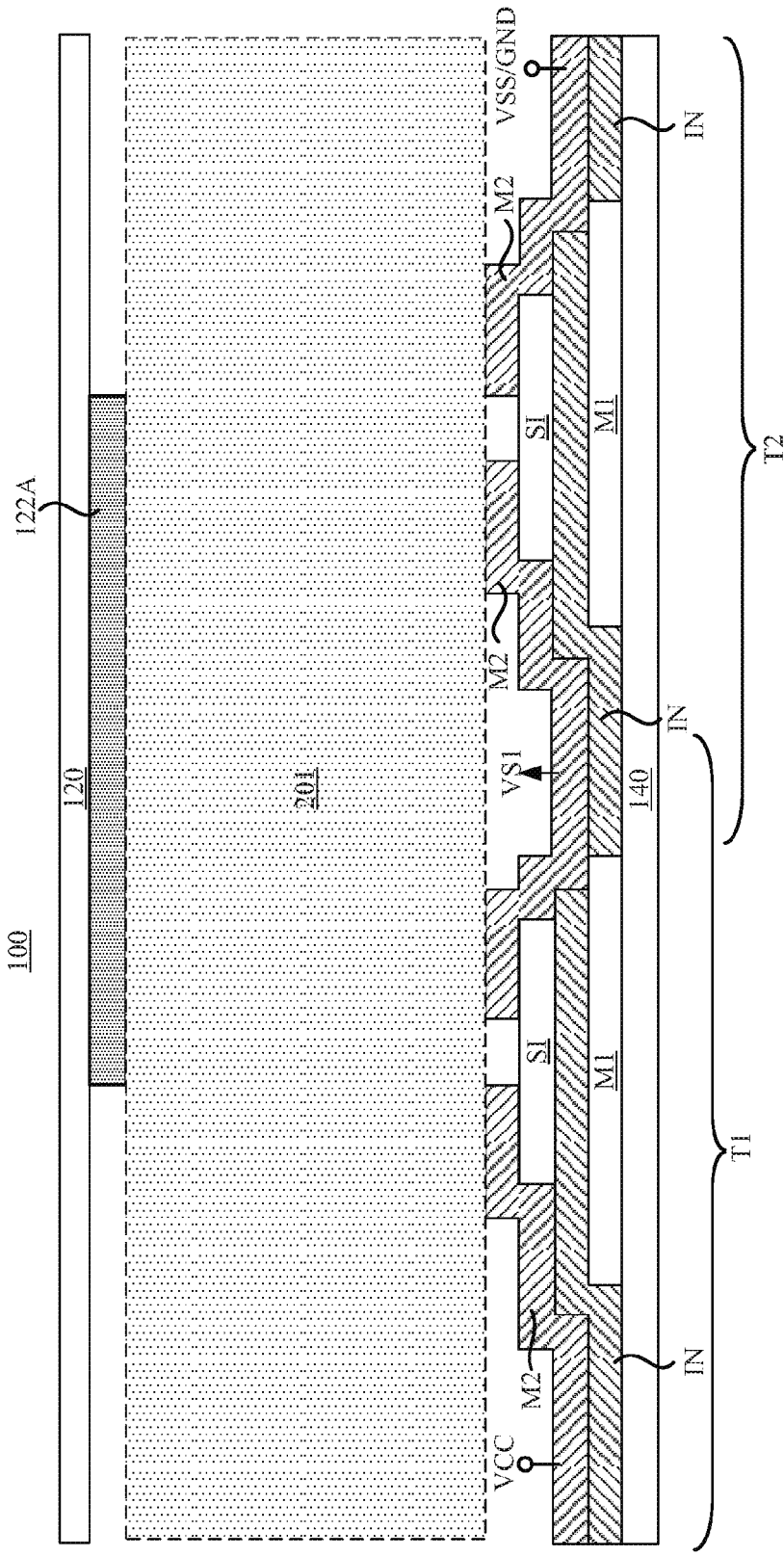
FIG. 2C is a partial cross-sectional view of the display panel shown in FIG. 1A, according to some embodiments of the present disclosure.

Reference is now made to FIG. 2C. FIG. 2C is a partial cross-sectional view of the display panel 100 shown in FIG. 1A, according to some embodiments of the present disclosure.

As shown in FIG. 2C, the optical sensor 200 includes a metal layer M1, a metal layer M2, an amorphous silicon layer SI and an isolation layer IN. The metal layer M1 is disposed on the substrate 140 to form the respective control terminals of the TFT T1 and the TFT T2. The metal layer M2 is used to form the first terminals and the second terminals of the TFT T1 and the TFT T2. The isolation layer IN is disposed between the metal layer M1 and the amorphous silicon layer SI. The metal layer M2 is stacked on the isolation layer IN, the metal layer M1 and the amorphous silicon layer SI. A part of the metal layer M2 forming the second terminal of the TFT T1 contacts with the metal layer M1, and thus the voltage difference between the control terminal and the second terminal of the TFT T1 is zero. Similarly, a part of the metal layer M2 forming the second terminal of the TFT T2 contacts with the metal layer M1, and thus the voltage difference between the control terminal and the second terminal of the TFT T2 is zero. In the example, a transparent layer 201 is further disposed between the substrate 120 and the substrate 140. An external light source can irradiate the TFT T1 and the TFT T2 through the substrate 120 and the transparent layer 201. When the location of the shading module 122A is shifted towards the TFT T1, the structure of the TFT T2 is irradiated by more light. When the location of the shading module 122A is shifted towards the TFT T2, the structure of the TFT T1 is irradiated by more light. Therefore, the optical sensor 200 can output the sensing signal VS1 having the high or low electric level according to the shift direction between the optical sensor 200 and the shading module 122A.

The arrangements and the structure of the optical sensor 200 in FIG. 2A and FIG. 2C are given for illustrative purpose only. Various arrangements and structures of the optical sensor 200 are within the contemplated scope of the present disclosure.

Figure 3A:
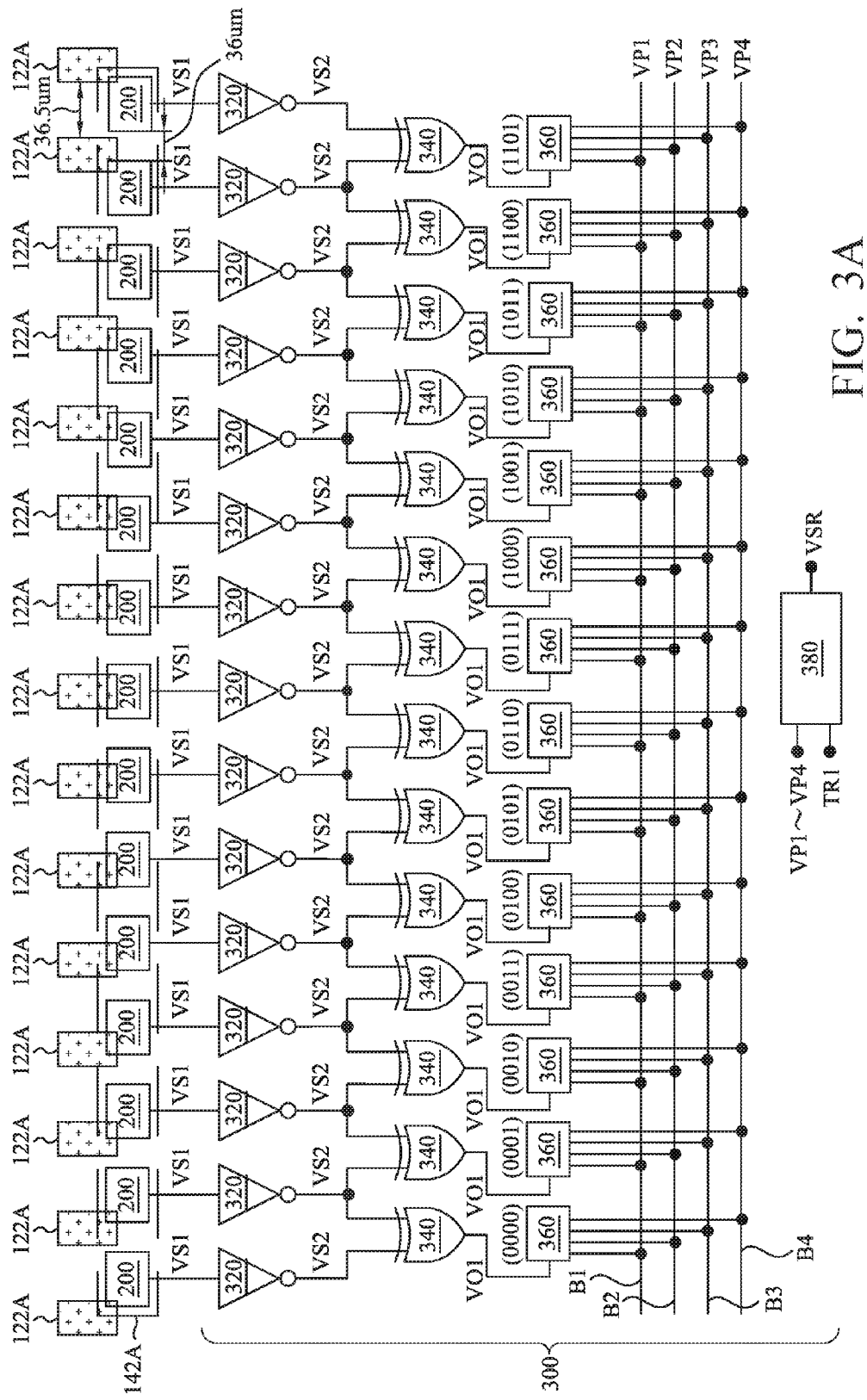
FIG. 3A is a schematic diagram illustrating a parallel-to-serial converter, according to some embodiments of the present disclosure.

Reference is now made to FIG. 3A., FIG. 3A is a schematic diagram illustrating a parallel-to-serial converter, according to some embodiments of the present disclosure.

In some embodiments, intervals between the optical sensors 200 are different from intervals between the shading modules 122A. For example, in the embodiment, the optical sensors 200 are disposed juxtaposed with the each others, and the interval between any two of the optical sensors 200 is about 36 micrometer (um). The interval between any two of the shading modules 122A is about 36.5 um. In other words, the interval between two optical sensors 200 and the interval between two shading module 122A are disposed to have a difference of 0.5 um. As described above, by the disposition, the TFT T1 is shaded by the shading module 122A in part of the optical sensors 200, the TFT T2 is shaded by the shading module 122A in part of the optical sensors 200, and both TFT T1 and TFT T2 are shaded by the shading module 122A in part of the optical sensors 200. Therefore, the optical sensors 200 will respectively output several sensing signals VS1 having different electrical levels to accordingly represent the shift amount between the optical sensors 200 and the shading modules 122A.

As shown in FIG. 3A, the parallel-to-serial converter 300 includes several inverters 320, several XOR gates 340, several switching circuits 360 and a multiplexer circuit 380. Each of the inverters 320 is coupled to a corresponding optical sensor 200 in the optical sensor modules 142A to output a sensing signal VS2 according to the corresponding sensing signal VS1. The XOR gates 340 are used to generate switching signals VO1 according to the sensing signals VS2 of two adjacent inverters 320. The switching circuits 360 are disposed corresponding to the XOR gates 340. In the embodiment, the switching circuits 360 are coupled to four buses B1-B4 to generate several locating signals VP1-VP4 according to corresponding location codes (i.e. "0000"-"1101" labeled in FIG. 3A) and the corresponding switching signals VO1. The multiplexer circuit 380 is used to receive the locating signals VP1-VP4 through the four buses B1-B4 to generate the serial signal VSR according to the locating signals VP1-VP4 and an initial trigger signal TR1.

The arrangement of the parallel-to-serial converter 300 in FIG. 3A is given for illustrative purposes only, and the disclosure is not limited thereto. In some other embodiments, the parallel-to-serial converter 300 may generate the serial signal VSR without the inverters 320. For example, the XOR gates 340 may directly receive the sensing signals VS1 outputted from two adjacent optical sensors 200, and generate the switching signals VO1 according to the two sensing signals VS1.

Figure 3B:
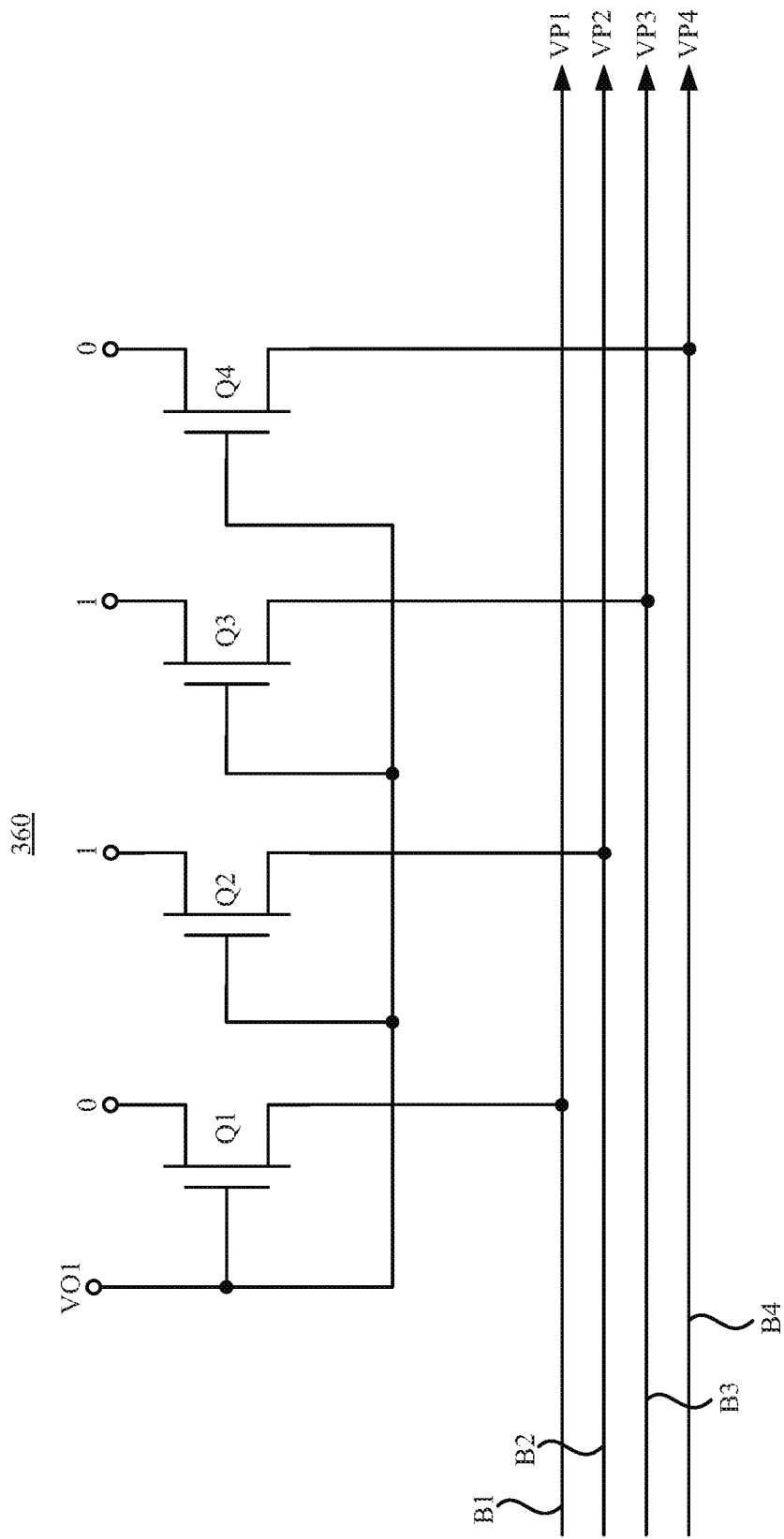
FIG. 3B is a schematic diagram illustrating the switching circuit shown in FIG. 3A, according to some embodiments of the present disclosure.

Reference is made to FIG. 3B. FIG. 3B is a schematic diagram illustrating the switching circuit 360 shown in FIG. 3A, according to some embodiments of the present disclosure. For clearly describing the dispositions and related operations of the switching circuits 360, only one switching circuit 360 is illustrated in FIG. 3B, and the dispositions and the operations of the other switching circuits 360 may be understood by analogy and therefore they will not be repeated.

As shown in FIG. 3A, the corresponding location codes are sequentially configured in each of the switching circuits 360, in which the location codes are set by a high voltage (e.g. about 15 volts) and a low voltage (e.g. about 0 volt). For example, in the embodiment, one of the location codes is configured to be "0110", in which the bit "0" of the location code is set by the low voltage, and the bit "1" of the location code is set by the high voltage. As shown in FIG. 3B, the switching circuit 360 includes a control switch Q1, a control switch Q2, a control switch Q3 and a control switch Q4. First terminals of the control switches Q1-O4 are configured to receive the high voltage or the low voltage according to different location codes. In the embodiment, the first terminal of the control switch Q1 is used to receive the low voltage (i.e. logical "0"), a second terminal of the control switch Q1 is coupled to the bus B1 for outputting the locating signal VP1, and a control terminal of the control switch Q1 is used to receive the switching signal VO1. The first terminal of the control switch Q2 is used to receive the high voltage (i.e. logic "1"), a second terminal of the control switch Q2 is coupled to the bus B2 for outputting the locating signal VP2, and a control terminal of the control switch Q2 is used to receive the switching signal VO1. The first terminal of the control switch Q3 is used to receive the high voltage (i.e. logic "1"), a second terminal of the control switch Q3 is coupled to the bus B3 for outputting the locating signal VP3, and a control terminal of the control switch Q3 is used to receive the switching signal VO1. The first terminal of the control switch Q4 is used to receive the low voltage (i.e. logic "0"), a second terminal of the control switch Q4 is coupled to the bus B4 for outputting the locating signal VP4, and a control terminal of the control switch Q4 is used to receive the switching signal VO1. By pre-setting a corresponding set of location code for each switching circuit 360, the control switches Q1-O4 in each switching circuit 360 can be selectively turned on according to the corresponding switching signal VO1 to output different switching signals VP1-VP4 accordingly. Therefore, the shift situation of the substrate 120 and the substrate 140 can be determined by verifying the values of the switching signals VP1-VP4. The specific operation will be described below.

Figure 3C:
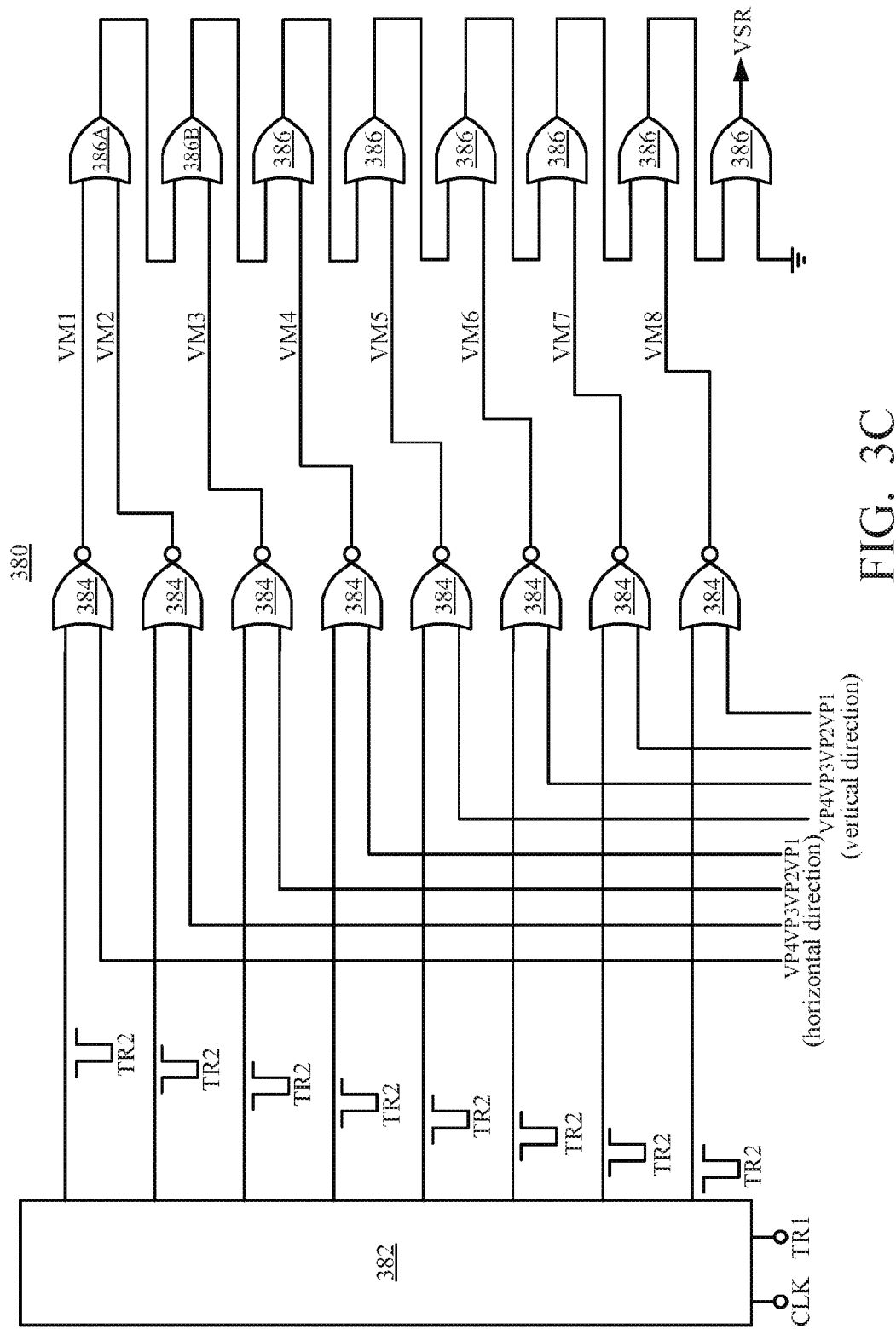
FIG. 3C is a schematic diagram illustrating the multiplexer circuit shown in FIG. 3A, according to some embodiments of the present disclosure.

Reference is now made to FIG. 3C. FIG. 3C is a schematic diagram illustrating the multiplexer circuit 380 shown in FIG. 3A, according to some embodiments of the present disclosure. As shown in FIG. 3C, the multiplexer circuit 380 includes a shift register 382, several NOR gates 384 and several OR gates 386.

The shift register 382 is configured to sequentially generate trigger signals TR2 according to the initial trigger signal TR1 and a clock signal CLK, in which a predetermined phase difference exists between the trigger signals TR2. In some embodiments, the shift register 382 is an 8-bit shift register composed of D-type flip-flops triggered by falling edges and inverters. The embodiment is given for illustrative purpose only, any other types of shift register circuit can be applied to the shift register 382.

In addition, the NOR gates 384 are configured to output multiplex signals VM1-VM8 according to a corresponding one of the locating signals VP1-VP4 and one corresponding trigger signal TR2. For example, with reference to FIG. 1B together, the first four NOR gates 384 sequentially receive the locating signals VP4-VP1 (in response to the horizontal shift amount) generated by the sensing signal VS1 outputted from the optical sensor module O1. The last four NOR gates 384 may receive the locating signals VP4-VP1 (in response to the vertical shift amount) generated by the sensing signal VS1 outputted from the optical sensor module O2. Therefore, the horizontal and vertical shift amounts between the optical sensor modules 142A and the shading module 122A can be measured together. The OR gates 386 are used to output the serial signal VSR according to the multiplex signals VM1-VM8.

As shown in FIG. 3C, a signal outputted by each OR gate 386 is transmitted to an input terminal of the OR gate 386 in the next stage. As a result, the OR gate 386 in the last stage outputs the serial signal VSR according to all of the multiplex signals VM1-VM8. To simplify the description, the structures of the OR gate 386A in the first stage and the OR gate 386B in the second stage are taken as an example. A first input terminal of the OR gate 386A is used to receive the multiplex signal VM1, and a second input terminal of the OR gate 386A is used to receive a multiplex signal VM2. A first input terminal of the OR gate 386B is coupled to an output terminal of the OR gate 386A, and a second input terminal of the OR gate 386B is used to receive the multiplex signal VM3. Equivalently, the output of the OR gate 386B is determined by the multiplex signal VM1, the multiplex signal VM2 and the multiplex signal VM3. By analogy, the serial signal VSR is determined by the multiplex signals VM1-VM8.

Figure 4:
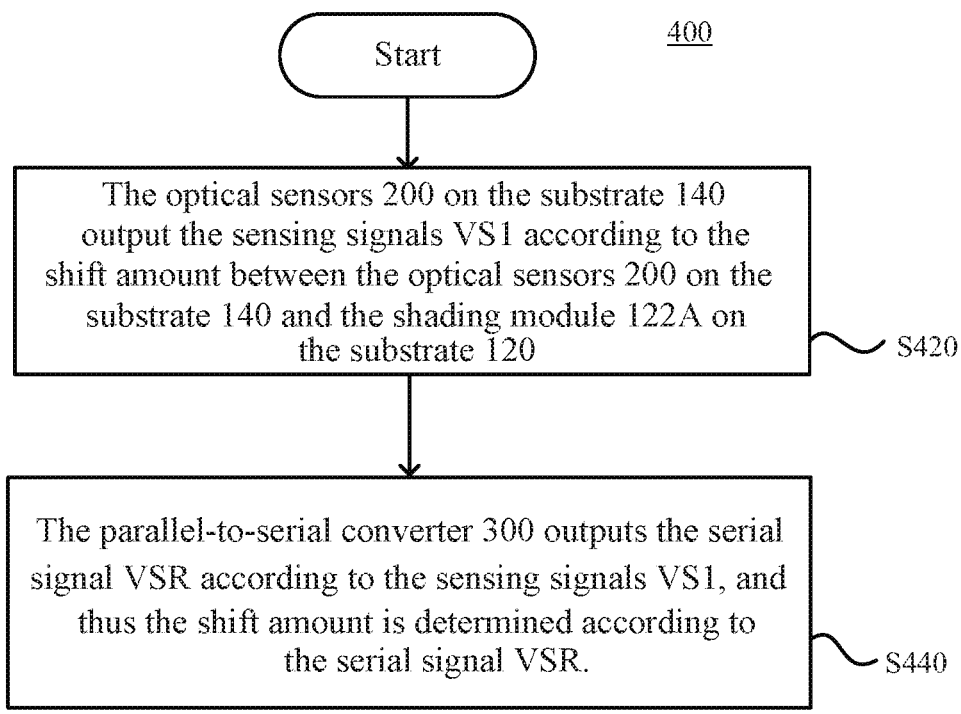
FIG. 4 is a diagram illustrating a flow chart of a measurement method, according to some embodiments of the present disclosure.
Figure 5A:
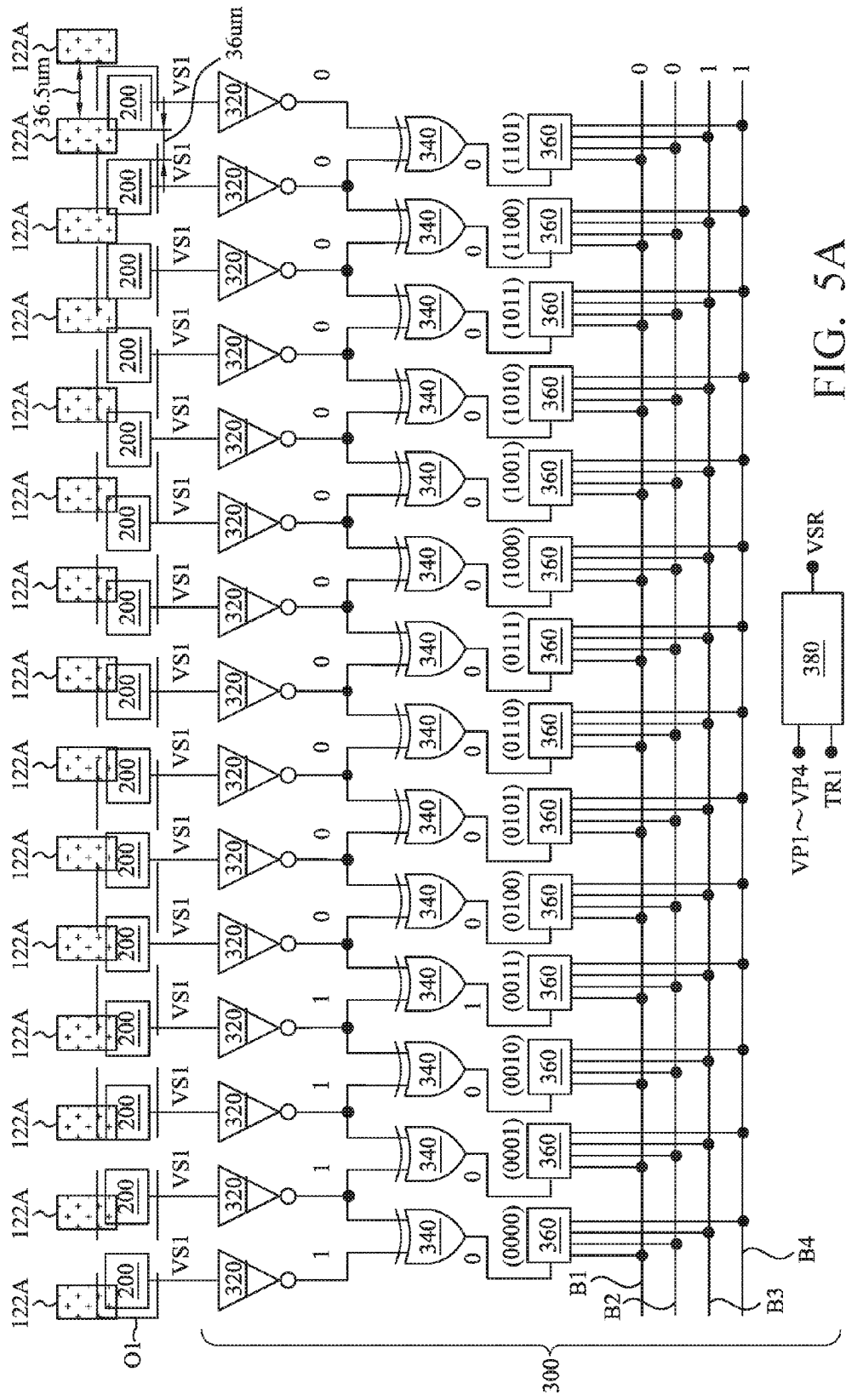
FIG. 5A a schematic diagram illustrating the state of the sensing signals of the optical sensors shown in FIG. 1B and signal states of the parallel-to-serial converter shown in FIG. 3A, according to some embodiments of the present disclosure.
Figure 5B:
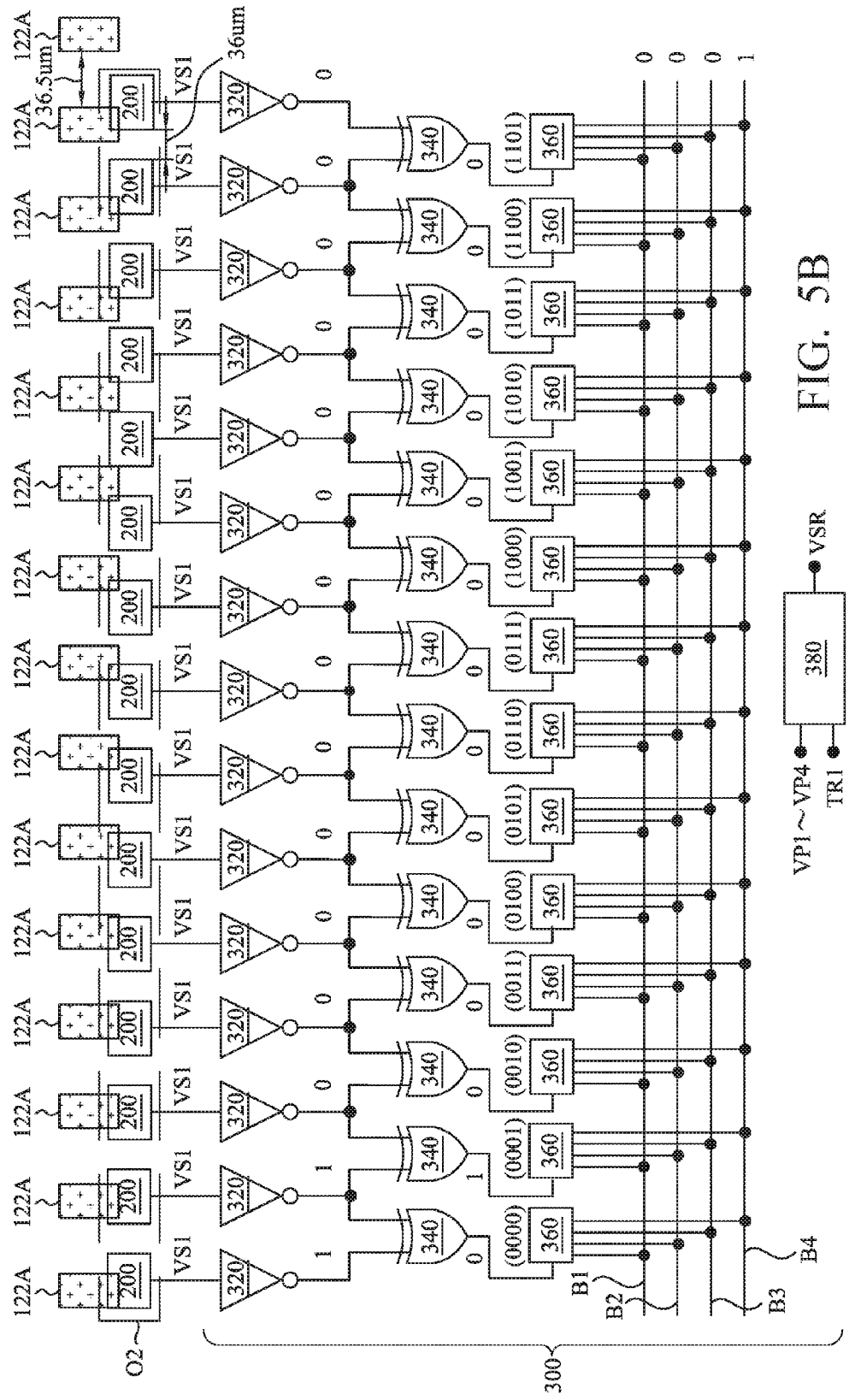
FIG. 5B a schematic diagram illustrating the state of the sensing signals of the optical sensors shown in FIG. 1B and signal states of the parallel-to-serial converter shown in FIG. 3A according to an embodiment of the present disclosure.

FIG. 4 is a diagram illustrating a flow chart of a measurement method 400, according to some embodiments of the present disclosure. The measurement method 400 may be used to measure the display panel 100 in FIG. 1A. FIG. 5A is a schematic diagram illustrating the states of the sensing signals of the optical sensor module O1 shown in FIG. 1B and signal states of the parallel-to-serial converter 300 shown in FIG. 3A, according to some embodiments of the present disclosure. FIG. 5B is a schematic diagram illustrating the states of the sensing signals of the optical sensor module O2 shown in FIG. 1B and signal states of the parallel-to-serial converter 300 shown in FIG. 3A, according to some embodiments of the present disclosure. FIG. 5C is a diagram illustrating waveforms of the initial trigger signal and the serial signals, according to some embodiments of the present disclosure. For clear description, reference is now made to FIG. 4, FIG. 5A, FIG. 5B and FIG. 5C together, and the operations of the parallel-to-serial converter 300 are described with the measurement method 400.

In step S420, the optical sensors 200 on the substrate 140 output the sensing signals VS1 according to the shift amount between the optical sensors 200 on the substrate 140 and the shading module 122A on the substrate 120.

In step S440, the parallel-to-serial converter 300 outputs the serial signal VSR according to the sensing signals VS1, and thus the shift amount is determined according to the serial signal VSR.

For example, as shown in FIG. 5A, the optical sensor module O1 is used to measure the horizontal shift amount between the shading module 122A and the optical sensors 200. In the example, the shading module 122A is shifted about 1.5 um along the horizontal direction. As shown in FIG. 5A, the optical sensors 200 generate the sensing signals VS1 with different states according to different shading locations. The inverters 320 accordingly output several different sensing signals VS2 which signal values are "111100000000000" in the order from left to right. Therefore, the XOR gates 340 correspondingly output several different switching signals VO1. In the example, only the switching circuit 360 which corresponding location code is "0011" is activated to output the locating signals VP1-VP4, in which the signal values of the locating signals VP1-VP4 are respectively the same with the bits in the location code "0011". In other words, the signal value of the locating signal VP1 is "0", the signal value of the locating signal VP2 is "0", the signal value of the locating signal VP3 is "1", and the signal value of the locating signal VP4 is "1".

Similarly, as shown in FIG. 5B, the optical sensor module O2 is used to measure the vertical shift amount between the shading module 122A and the optical sensors 200. In the example, the shading module 122A is shifted about 2.5 um along the vertical direction. In the example, only the switching circuit 360 which corresponding location code is "0001" is activated to output the locating signals VP1-VP4, in which signal values of the locating signals VP1-VP4 are respectively the same with the bits in the location code "0001". In other words, the signal value of the locating signal VP1 is "0", the signal value of the locating signal VP2 is "0", the signal value of the locating signal VP3 "0", and the signal value of the locating signal VP4 is "1".

In addition, when no shift exists between the shading module 122A and the optical sensor module O1 or the optical sensor module O2, through the operation described above, the switching circuit 360 will output the locating signals VP1-VP4, in which the signal value of the locating signal VP1 is "0", the signal value of the locating signal VP2 is "1", the signal value of the locating signal VP3 is "1", and the signal value of the locating signal VP4 is "0".

As described above, the optical sensor module O1 and the optical sensor module O2 can share the same parallel-to-serial converter 142B. For example, as shown in FIG. 3C, the multiplexer circuit 380 in the parallel-to-serial converter 300 can simultaneously receive the locating signals VP1-VP4 transmitted from the optical sensor module O1 (corresponding to the horizontal direction) and from the optical sensor module O2 (corresponding to the vertical direction), and accordingly outputs the serial signal VSR. As shown in FIG. 5C, the multiplexer circuit 380 outputs the serial signal VSR according to the locating signals VP1-VP4. The bits in the serial signal VSR are "11101100" in sequence, in which the first four bits "1110" in the serial signal VSR are respectively opposite to the signal values "0001" of the locating signals VP1-VP4 outputted from the optical sensor module O2, and the last four bits "1100" of the serial signal VSR are opposite to the signal values "0011" of the locating signals VP1-VP4 outputted from the optical sensor module O1. In other words, the serial signal VSR can reflect the horizontal and vertical shift situation between the shading module 122A and the optical sensor modules 142A.

By the description above, the display panel 100 may transmit the serial signal VSR to the external cell tester 100A, and the component tester 100A may compute according to the serial signal VSR to obtain the horizontal and vertical shift amount between the substrate 120 and the substrate 140. For example, as described above, intervals between the optical sensors 200 are different from intervals between the shading modules 122A for about 0.5 um. The cell tester 100A can invert each bit in the serial signal VSR to obtain the states of the locating signals VP1-VP4 along the corresponding direction, and further transform them into a decimal value to compute the shift amount. In detail, when no shift exists between the shading module 122A and the optical sensor module O1 or the optical sensor module O2, the signal values of the locating signals VP1-VP4 are "0", "1", "1" and "0", respectively. After the decimal transformation, the cell tester 100A can record that the decimal value of the first four bits or the last four bits of the serial signal VSR should be "6" (i.e. the corresponding decimal value of "0110"). Therefore, in this example, the cell tester 100A can obtain that the corresponding signal values of the locating signals VP1-VP4 are "0001" because the first bits of the serial signal VSR are "1110", and accordingly compute the corresponding decimal value "1". Further, the cell tester 100A can compute according to a following equation (1) and obtain that the shift amount between the shading module 122A and the optical sensor module O2 is about 2.5 um.

$$0.5 \times (6-1) = 2.5 \ldots \qquad (1).$$

Similarly, in this example, the cell tester 100A can obtain that the corresponding signal values of the locating signals VP1-VP4 are "1100" because the last four bits of the serial signal VSR are "0011", and accordingly compute the corresponding decimal value "3". Further, the cell tester 100A can compute according to a following equation (2) to obtain that the shift amount between the shading module 122A and the optical sensor module O1 is about 1.5 um.

$$0.5 \times (6-3) = 1.5 \ldots \qquad (2).$$

In other words, through the computations, the cell tester 100A can obtain that the shading module 122A and the optical sensor modules 142A are shifted about 1.5 um along the vertical direction, and the shading module 122A and the optical sensor modules 142A are shifted about 2.5 um along the horizontal direction. Therefore, the cell tester 100A can estimate a variation of the aperture rate of the display area 142 according to the aforementioned information, and correspondingly adjust the brightness of the display area 142. As a result, the stability and the brightness performance of the display panel 100 are improved.

The operation is described taking the cell tester 100A as an example, but the present disclosure is not limited thereto. For example, the operation may be performed by any circuit integrated in the display panel 100.

As described above, in the display panel, the optical sensor, and the measurement method disclosed in the present disclosure, whether a shift exists in the arrangement of the components in the display panel or not is determined by establishing an optical sensing mechanism in the panel, and the brightness of the display panel is automatically adjusted according to the shift situation.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display panel, comprising:
   a first substrate;
   a shading module disposed on the first substrate;
   a second substrate disposed corresponding to the first substrate;
   a plurality of optical sensors disposed on the second substrate and disposed corresponding to the shading module, wherein the optical sensors are configured to output a plurality of first sensing signals according to a shift amount between the optical sensors and the shading module; and
   a parallel-to-serial converter configured to generate a serial signal according to the first sensing signals,
   wherein a first optical sensor of the optical sensors comprises a first switch and a second switch, a first terminal of the first switch is configured to receive a first system voltage, a second terminal of the first switch is configured to output one of the first sensing signals, a control terminal of the first switch is coupled to the second terminal of the first switch, a first terminal of the second switch is coupled to the second terminal of the first switch, a second terminal of the second switch is configured to receive a second system voltage, the first system voltage is higher than the second system voltage, and a control terminal of the second switch is coupled to the second terminal of the second switch.

2. The display panel of claim 1, wherein the parallel-to-serial converter comprises:
   a plurality of XOR gates configured to generate a plurality of switching signals according to two of the first sensing signals, wherein the two of the first sensing signals are generated by two adjacent ones of the optical sensors;
   a plurality of switching circuits disposed corresponding to the XOR gates, and configured to generate a plurality of locating signals according to a corresponding location code and a corresponding one of the switching signals; and
   a multiplexer circuit configured to generate the serial signal according to the locating signals and an initial trigger signal.

3. The display panel of claim 2, wherein the location code is set by a first voltage and a second voltage, and one of the switching circuits comprises:
   a first control switch, wherein the a first terminal of first control switch is configured to receive the first voltage or the second voltage, a second terminal of the first control switch is configured to output a first locating signal of the locating signals, and a control terminal of the first control switch is configured to receive a first switching signal of the switching signals;
   a second control switch, wherein a first terminal of the second control switch is configured to receive the first voltage or the second voltage, a second terminal of the second control switch is configured to output a second locating signal of the locating signals, and a control terminal of the second control switch is configured to receive the first switching signal;
   a third control switch, wherein a first terminal of the third control switch is configured to receive the first voltage or the second voltage, a second terminal of the third control switch is configured to output a third locating signal of the locating signals, and a control terminal of the third control switch is configured to receive the first switching signal; and
   a fourth control switch, wherein a first terminal of the fourth control switch is configured to receive the first voltage or the second voltage, a second terminal of the fourth control switch is configured to output a fourth locating signal of the locating signals, and a control terminal of the fourth control switch is configured to receive the first switching signal.

4. The display panel of claim 2, wherein the parallel-to-serial converter further comprises:
   a plurality of inverters disposed corresponding to the optical sensors, and configured to receive the first sensing signals to output a plurality of second sensing signal,
   wherein the XOR gates are further configured to generate the switching signals according to two of the second sensing signals.

5. The display panel of claim 2, wherein the multiplexer circuit comprises:
   a plurality of NOR gates configured to output a plurality of multiplex signals according to a corresponding one of the locating signals and a corresponding one of a plurality of trigger signals; and
   a plurality of OR gates configured to output the serial signal according to the multiplex signals.

6. The display panel of claim 5, wherein the OR gates comprise:
   a first OR gate, wherein a first input terminal of the first OR gate is configured to receive a first multiplex signal of the multiplex signals, and a second input terminal of the first OR gate is configured to receive a second multiplex signal of the multiplex signals; and
   a second OR gate, wherein a first input terminal of the second OR gate is coupled to an output terminal of the first OR gate, a second input terminal of the second OR gate is configured to receive a third multiplex signal of the multiplex signals, and an output terminal of the second OR gate is configured to output the serial signal.

7. The display panel of claim 5, wherein the multiplexer circuit further comprises:
   a shift register configured to sequentially generate the trigger signals according to the initial trigger signal and a clock signal, wherein a phase difference exists between the trigger signals.

8. The display panel of claim 1, wherein the second substrate further comprises:
   a display area, wherein a brightness of the display area is configured to be adjusted, by a cell tester, according to the serial signal.

9. A display panel, comprising:
a first substrate;
a shading module disposed on the first substrate;
a second substrate disposed corresponding to the first substrate;
a plurality of optical sensors disposed on the second substrate and disposed corresponding to the shading module, wherein the optical sensors are configured to output a plurality of first sensing signals according to a shift amount between the optical sensors and the shading module; and
a parallel-to-serial converter configured to receive the first sensing signals to generate a serial signal,
wherein one of the optical sensors is configured to receive a first system voltage and a second system voltage, and the first system voltage is higher than the second system voltage.

10. The display panel of claim 9, wherein the one of the optical sensors comprises:
a first light sensitive element having a first terminal and a second terminal, wherein the first terminal of the first light sensitive element is configured to receive the first system voltage and the second terminal of the first light sensitive element is configured to output a sensing signal; and
a second light sensitive element having a first terminal and a second terminal, wherein the first terminal of the second light sensitive element is coupled to the second terminal of the first light sensitive element and a second terminal of the second light sensitive element is configured to receive the second system voltage.

11. The display panel of claim 10, wherein the first light sensitive element and the second light sensitive element are implemented with a thin film transistor or a diode.

12. The display panel of claim 9, wherein the second system voltage comprises a ground voltage.

13. The display panel of claim 9, wherein the parallel-to-serial converter comprises:
a plurality of XOR gates configured to generate a plurality of switching signals according to two of the first sensing signals, wherein the two of the first sensing signals are generated by two adjacent ones of the optical sensors;
a plurality of switching circuits disposed corresponding to the XOR gates, and configured to generate a plurality of locating signals according to a corresponding location code and a corresponding one of the switching signals; and
a multiplexer circuit configured to generate the serial signal according to the locating signals and an initial trigger signal.

14. The display panel of claim 13, wherein the location code is set by a first voltage and a second voltage, and one of the switching circuits comprises:
a first control switch, wherein the a first terminal of first control switch is configured to receive the first voltage or the second voltage, a second terminal of the first control switch is configured to output a first locating signal of the locating signals, and a control terminal of the first control switch is configured to receive a first switching signal of the switching signals;
a second control switch, wherein a first terminal of the second control switch is configured to receive the first voltage or the second voltage, a second terminal of the second control switch is configured to output a second locating signal of the locating signals, and a control terminal of the second control switch is configured to receive the first switching signal;
a third control switch, wherein a first terminal of the third control switch is configured to receive the first voltage or the second voltage, a second terminal of the third control switch is configured to output a third locating signal of the locating signals, and a control terminal of the third control switch is configured to receive the first switching signal; and
a fourth control switch, wherein a first terminal of the fourth control switch is configured to receive the first voltage or the second voltage, a second terminal of the fourth control switch is configured to output a fourth locating signal of the locating signals, and a control terminal of the fourth control switch is configured to receive the first switching signal.

15. The display panel of claim 13, wherein the parallel-to-serial converter further comprises:
a plurality of inverters disposed corresponding to the optical sensors, and configured to receive the first sensing signals to output a plurality of second sensing signal,
wherein the XOR gates are further configured to generate the switching signals according to two of the second sensing signals.

16. The display panel of claim 13, wherein the multiplexer circuit comprises:
a plurality of NOR gates configured to output a plurality of multiplex signals according to a corresponding one of the locating signals and a corresponding one of a plurality of trigger signals; and
a plurality of OR gates configured to output the serial signal according to the multiplex signals.

17. A measurement method for measuring a display panel, the measurement method comprising:
outputting, by a plurality of optical sensors, a plurality of sensing signals according to a shift amount between the optical sensors and a plurality of black matrixes in the display panel,
wherein one of the optical sensors comprises a first switch and a second switch, a first terminal of the first switch is configured to receive a first system voltage, a second terminal of the first switch is configured to output one of the first sensing signals, a control terminal of the first switch is coupled to the second terminal of the first switch, a first terminal of the second switch is coupled to the second terminal of the first switch, a second terminal of the second switch is configured to receive a second system voltage, the first system voltage is higher than the second system voltage, and a control terminal of the second switch is coupled to the second terminal of the second switch; and
outputting, by a parallel-to-serial converter, a serial signal according to the sensing signals to determine the shift amount according to the serial signal.

18. The measurement method of claim 17, wherein the step of outputting the serial signal comprises:
generating, by a plurality of XOR gates, a plurality of switching signals according to two of the sensing signals, wherein the two of the sensing signals are generates by two adjacent ones of the optical sensors;
generating, by a plurality of switching circuits, a plurality of locating signals according a corresponding location code and a corresponding one of the switching signals; and generating, by a multiplexer circuits, the serial signal according to the locating signals and a plurality of trigger signals.

19. The measurement method of claim 18, further comprising:
sequentially determining the location codes corresponding to the switching circuits according to a first voltage and a second voltage.

20. The measurement method of claim 17, wherein the display panel comprises a display area, and the measurement method further comprises:
adjusting, by a cell tester, a brightness of the display area according to the serial signal.

\* \* \* \* \*